United States Patent
Kim et al.

(10) Patent No.: US 8,935,637 B2
(45) Date of Patent: Jan. 13, 2015

(54) MOBILE TERMINAL AND METHOD FOR OPERATING THE MOBILE TERMINAL

(75) Inventors: Cheegook Kim, Seoul (KR); Jungwhan Kim, Seoul (KR); Haengchul Kwak, Seoul (KR); Gukchan Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 352 days.

(21) Appl. No.: 13/155,277

(22) Filed: Jun. 7, 2011

(65) Prior Publication Data

US 2011/0304648 A1    Dec. 15, 2011

(30) Foreign Application Priority Data

Jun. 15, 2010  (KR) .................. 10-2010-0056698

(51) Int. Cl.
 *G06F 1/32* (2006.01)
 *G06F 1/16* (2006.01)
 *G06F 3/01* (2006.01)
 *G06F 3/041* (2006.01)
 *G06F 3/0488* (2013.01)
 *H04W 52/02* (2009.01)

(52) U.S. Cl.
 CPC ............ *G06F 1/3231* (2013.01); *G06F 1/1626* (2013.01); *G06F 3/016* (2013.01); *G06F 3/017* (2013.01); *G06F 3/0414* (2013.01); *G06F 3/0488* (2013.01); *H04W 52/0254* (2013.01); *G06F 2200/1636* (2013.01); *G06F 2200/1637* (2013.01); *G06F 2203/014* (2013.01)
 USPC .......................................... 715/863; 345/156

(58) Field of Classification Search
 None
 See application file for complete search history.

(56) References Cited

U.S. PATENT DOCUMENTS

| | | | | |
|---|---|---|---|---|
| 4,970,819 A * | 11/1990 | Mayhak | ...................... | 42/70.01 |
| 5,668,880 A * | 9/1997 | Alajajian | ..................... | 370/342 |
| 6,321,478 B1 * | 11/2001 | Klebes | .............................. | 42/84 |
| 6,968,216 B1 * | 11/2005 | Chen et al. | .................... | 455/567 |
| 2004/0140883 A1 * | 7/2004 | Jalil et al. | ..................... | 340/5.64 |
| 2005/0100147 A1 * | 5/2005 | Naick et al. | ................ | 379/93.24 |
| 2005/0134718 A1 * | 6/2005 | Honda | ..................... | 348/333.06 |
| 2005/0219210 A1 * | 10/2005 | Leland et al. | ................. | 345/157 |
| 2006/0101694 A1 * | 5/2006 | Matteson | ..................... | 42/69.01 |
| 2007/0054651 A1 * | 3/2007 | Farmer et al. | ................. | 455/352 |
| 2007/0162937 A1 * | 7/2007 | Casement et al. | .............. | 725/58 |
| 2007/0177804 A1 * | 8/2007 | Elias et al. | ..................... | 382/188 |
| 2007/0200734 A1 * | 8/2007 | Lee et al. | ......................... | 341/22 |
| 2008/0071559 A1 * | 3/2008 | Arrasvuori | ........................ | 705/1 |
| 2008/0115072 A1 * | 5/2008 | Lu | ................................. | 715/765 |
| 2009/0051648 A1 * | 2/2009 | Shamaie et al. | ............. | 345/156 |
| 2009/0197635 A1 * | 8/2009 | Kim et al. | .................. | 455/550.1 |
| 2009/0205041 A1 * | 8/2009 | Michalske | ....................... | 726/17 |
| 2010/0123664 A1 * | 5/2010 | Shin et al. | ...................... | 345/169 |
| 2010/0167787 A1 * | 7/2010 | Weisbrod | ..................... | 455/566 |

(Continued)

*Primary Examiner* — David H Chu
(74) *Attorney, Agent, or Firm* — Lee, Hong, Degerman, Kang & Waimey

(57) ABSTRACT

A mobile terminal and a method for operating the mobile terminal are provided. The method senses touch of the mobile terminal in a predetermined mode and senses movement of the mobile terminal upon determining that the mobile terminal has been gripped based on the touch and then changes the mode of the mobile terminal according to the predetermined mode and the movement of the mobile terminal. This method enhances user convenience since it is possible to change the mode of the mobile terminal through movement of the mobile terminal while the mobile terminal is gripped.

17 Claims, 14 Drawing Sheets

(56) References Cited

U.S. PATENT DOCUMENTS

| | | | |
|---|---|---|---|
| 2010/0197352 A1* | 8/2010 | Runstedler et al. | 455/566 |
| 2010/0292945 A1* | 11/2010 | Reynolds et al. | 702/65 |
| 2011/0018817 A1* | 1/2011 | Kryze et al. | 345/173 |
| 2011/0066984 A1* | 3/2011 | Li | 715/863 |
| 2011/0151841 A1* | 6/2011 | Zhang | 455/414.1 |
| 2011/0167391 A1* | 7/2011 | Momeyer et al. | 715/863 |
| 2011/0175816 A1* | 7/2011 | Shin | 345/168 |
| 2012/0017148 A1* | 1/2012 | Watt et al. | 715/708 |

* cited by examiner

MOBILE TERMINAL AND METHOD FOR OPERATING THE MOBILE TERMINAL

CROSS-REFERENCE TO RELATED APPLICATION

Pursuant to 35 U.S.C. §119(a), this application claims the benefit of earlier filing date and right of priority to Korean Patent Application No. 10-2010-0056698, filed on Jun. 15, 2010, the contents of which is hereby incorporated by reference herein in its entirety.

BACKGROUND OF THE INVENTION

1. Field of the Invention

The present invention relates to a mobile terminal and a method for operating the mobile terminal, and more particularly to a mobile terminal and a method for operating the mobile terminal, wherein a mode of the mobile terminal can be changed according to a touched state and movement of the mobile terminal.

2. Description of the Related Art

Mobile terminals are portable devices capable of performing voice/video calls, inputting and outputting information, and/or storing data. As the functions of mobile terminals diversify, an increasing number of mobile terminals have become able to provide various complicated functions, such as capturing photos and moving images, playing music files and moving image files, providing games, receiving broadcast programs, and providing wireless Internet services. Various novel attempts have been made in terms of hardware or software to provide more complex functions to the mobile terminal implemented as such a multimedia player. One example is provision of a user interface environment allowing the user to easily and conveniently find and select a desired function. Some mobile terminals employ a double-sided Liquid Crystal Display (LCD), which can be viewed from both sides, or a touch screen.

However, allocation of space for a user interface such as a keypad or a display is restricted since the mobile terminal should be designed taking into consideration mobility or portability. To efficiently use various complex functions provided by the mobile terminal, there is a need to control the operation of the mobile terminal using a new input scheme instead of a generally used input scheme or menu structure.

SUMMARY OF THE INVENTION

The present invention provides a mobile terminal and a method for operating the mobile terminal, wherein it is possible to change the mode of the mobile terminal according to a set mode and movement of the mobile terminal while the mobile terminal is gripped.

According to an aspect of the present invention, there is provided a method for operating a mobile terminal, the method including sensing touch of the mobile terminal in a predetermined mode, sensing movement of the mobile terminal upon determining that the mobile terminal has been gripped based on the touch, and changing a mode of the mobile terminal according to the predetermined mode and the movement of the mobile terminal.

According to another aspect of the present invention, there is provided a mobile terminal including a main body, a touch sensor for sensing touch of the main body, a motion sensor for sensing movement of the main body, and a controller for waking up the motion sensor upon determining that the main body has been gripped based on the touch sensed by the touch sensor and changing a mode of the mobile terminal according to the movement sensed by the motion sensor and a current mode of the mobile terminal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), a navigation device, a tablet computer, or an electronic book (e-book) reader. In this disclosure, the terms 'module' and 'unit' can be used interchangeably.

Figure 1:
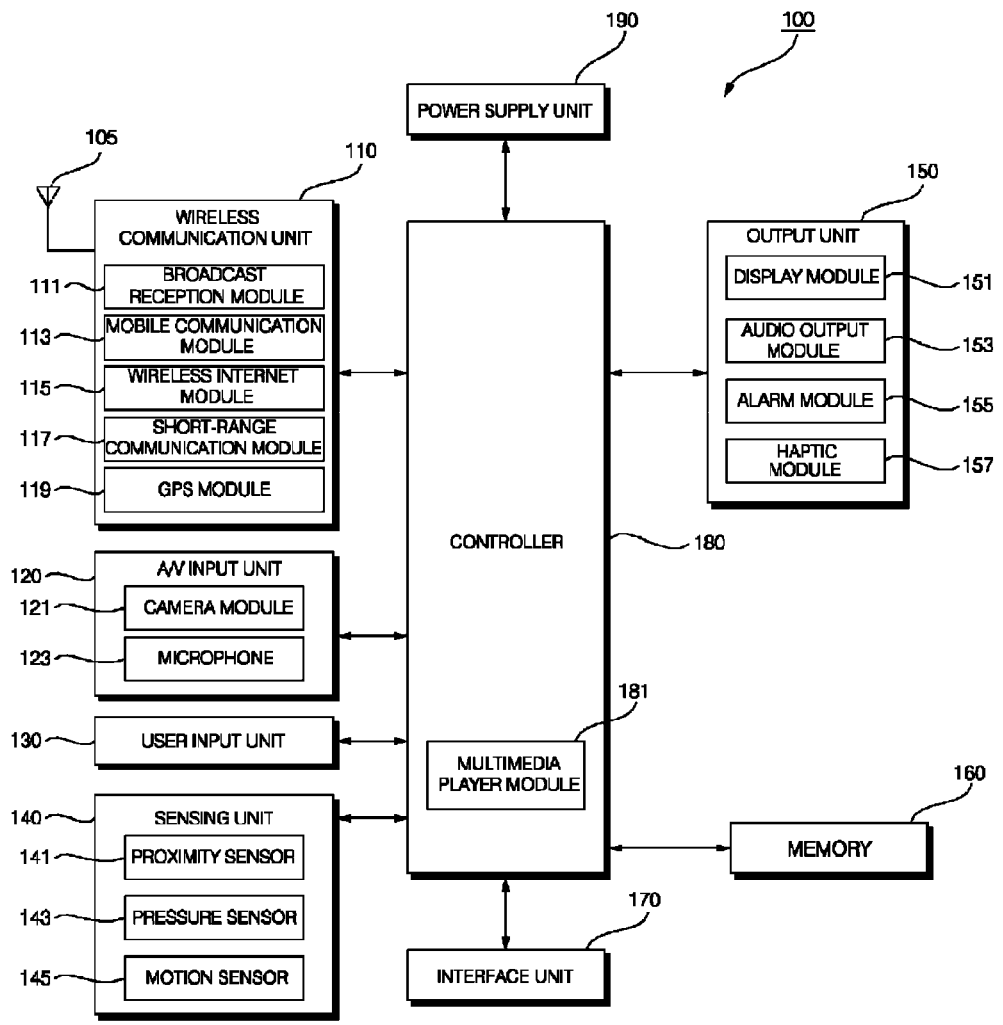
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Here, when the above constituent elements are implemented, two or more of the constituent elements may be combined into one constituent element, or one constituent element may be divided into two or more constituent elements, if appropriate.

The wireless communication unit 110 may include a broadcast reception module 111, a mobile communication module 113, a wireless internet module 115, a short-range communication module 117, and a global positioning system (GPS) module 119.

The broadcast reception module 111 may receive broadcast signals and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signals may include a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111.

The broadcast reception module 111 may receive broadcast signals using various broadcasting systems. In particular, the broadcast reception module 111 may receive digital broadcast signals using various digital broadcasting systems. In addition, the broadcast reception module 111 may be suitable not only for digital broadcasting systems but also for nearly all types of broadcasting systems other than digital broadcasting systems. The broadcast signal or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive location information from a plurality of GPS satellites.

The A/V input unit 120 may be used to receive audio signals or video signals. The A/V input unit 120 may include a camera module 121 and a microphone 123. The camera module 121 may process various image frames such as still images or moving images captured by an image sensor during a video call mode or an image capturing mode. The image frames processed by the camera module 121 may be displayed by a display module 151.

The image frames processed by the camera module 121 may be stored in the memory 160 or may be transmitted to an external device through the wireless communication unit 110. The mobile terminal 100 may include two or more cameras 121.

The microphone 123 may receive external audio signals during a call mode, a recording mode, or a voice recognition mode and may convert the received sound signals into electrical audio data. During the call mode, the mobile communication module 113 may convert the electrical sound data into data that can be readily transmitted to a mobile communication base station, and may then output the data obtained by the conversion. The microphone 123 may use various noise removal algorithms to remove noise that may be generated during the reception of external sound signals.

The user input unit 130 may generate key input data based on a user input for controlling the operation of the mobile terminal 100. The user input unit 130 may be implemented as a keypad, a dome switch, or a static pressure or capacitive touch pad which is capable of receiving a command or information by being pushed or touched by a user. Alternatively, the user input unit 130 may be implemented as a wheel, a jog dial or wheel, or a joystick capable of receiving a command or information by being rotated. Still alternatively, the user input unit 130 may be implemented as a finger mouse. In particular, if the user input unit 130 is implemented as a touch pad and forms a mutual layer structure with the display module 151, the user input unit 130 and the display module 151 may be collectively referred to as a touch screen.

The sensing unit 140 may determine a current state of the mobile terminal 100 such as whether the mobile terminal 100 is opened or closed, the location of the mobile terminal 100 and whether the mobile terminal 100 is placed in contact with the user, and may generate a sensing signal for controlling the operation of the mobile terminal 100. For example, when the mobile terminal 100 is a slider-type mobile phone, the sensing unit 140 may determine whether the mobile terminal 100 is opened or closed. In addition, the sensing unit 140 may determine whether the mobile terminal 100 is powered by the power supply unit 190 and whether the interface unit 170 is connected to an external device.

The sensing unit 140 may include a proximity sensor 141, a pressure sensor 143 and a motion sensor 145. The proximity sensor 141 may detect an approaching object or whether there is an object nearby the mobile terminal 100 without mechanical contact. More specifically, the proximity sensor 141 may detect an approaching object based on a change in an alternating current (AC) magnetic field or a static magnetic field, or the rate of change of capacitance. The sensing unit 140 may include two or more detection sensors 141.

The pressure sensor 143 may determine whether pressure is being applied to the mobile terminal 100 or may measure the magnitude of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated by applying greater pressure than that used to generate a typical touch input, based on a signal output by the pressure sensor 143. In addition, it is possible to determine the magnitude of pressure applied to the display module 151 upon receiving a pressure touch input based on the signal output by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, two or more acceleration sensors representing different axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a mutual layer structure and are thus implemented as a touch screen, the display module 151 may be used not only as an output device but also as an input device capable of receiving information by being touched by the user.

If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving an incoming call or message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a list of contacts, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior structure of the mobile terminal 100 will hereinafter be described in detail with reference to FIGS. 2 and 3. The present invention can be applied to nearly all types of mobile terminals such as a folder-type, a bar-type, a swing-type and a slider-type mobile terminal. However, for convenience, it is assumed that the mobile terminal 100 is a bar-type mobile terminal equipped with a full touch screen.

Figure 2:
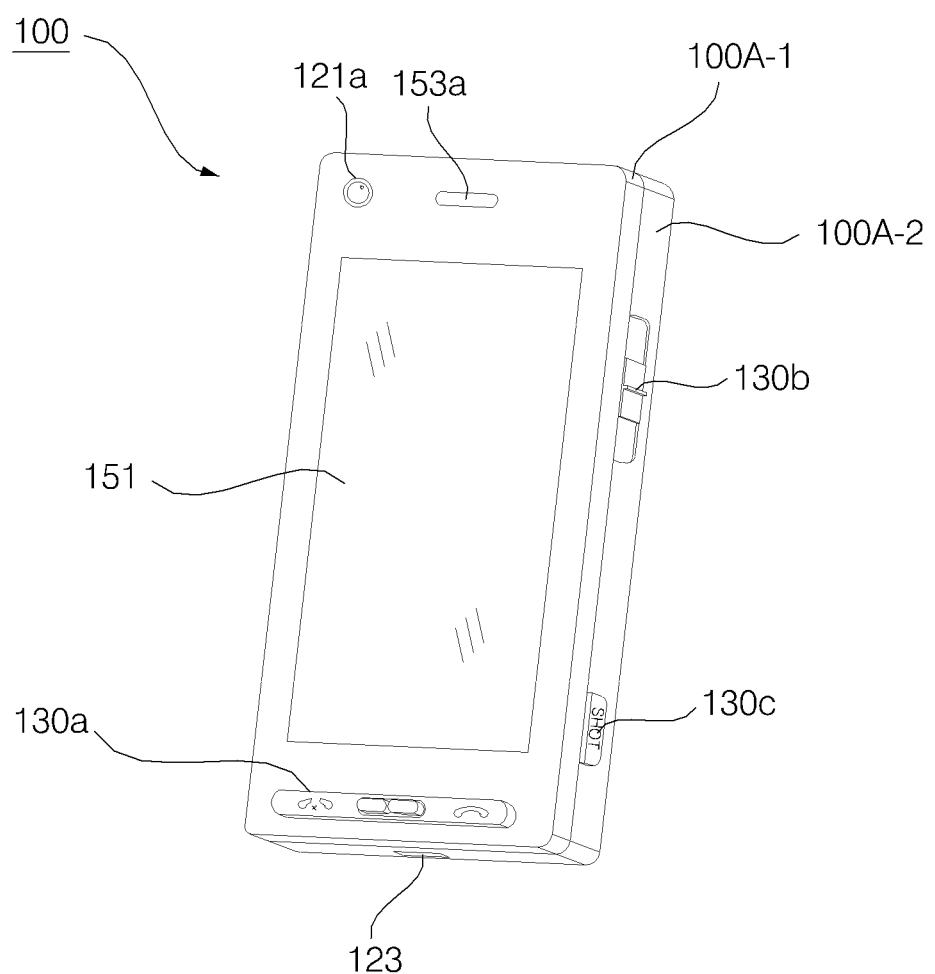
FIG. 2 illustrates a front perspective view of the mobile terminal shown in FIG. 1.

FIG. 2 illustrates a front perspective view of the mobile terminal 100. Referring to FIG. 2, the exterior of the mobile terminal 100 may be formed by a front case 100A-1 and a rear case 100A-2. Various electronic devices may be installed in the space formed by the front case 100A-1 and the rear case 100A-2. At least one middle case (not shown) may be additionally provided between the front case 100A-1 and the rear case 100A-2. The front case 100A-1, the rear case 100A-2 and the middle case(s) may be formed of a synthetic resin through injection molding. Alternatively, the front case 100A-1 and the rear case 100A-2 may be formed of a metal such as stainless steel (STS) or titanium (Ti).

The display module 151, a first audio output module 153a, a first camera 121a, and a first user input module 130a may be disposed in the main body of the mobile terminal 100, and particularly, in the front case 100A-1. Second and third user input modules 130b and 130c and the microphone 123 may be disposed on one side of the rear case 100A-2.

The display module 151 may include an LCD or OLED that can visualize information. If a touch pad is configured to overlap the display module 151 and thus to form a mutual layer structure, the display module 151 may serve as a touch screen. Thus, the user can enter various information to the mobile terminal 100 simply by touching the display module 151.

The first audio output module 153a may be implemented as a receiver or a speaker. The first camera 121a may be configured to be suitable for capturing a still or moving image of the user. The microphone 123 may be configured to properly receive the user's voice or other sounds.

The first through third user input modules 130a through 130c and fourth and fifth user input modules 130d and 130e may be collectively referred to as the user input unit 130. The user input unit 130 may adopt various tactile manners as long as it can offer tactile feedback to the user.

For example, the user input unit 130 may be implemented as a dome switch or touch pad capable of receiving a command or information by being pushed or touched by the user; or a wheel, a jog dial or wheel, or a joystick capable of receiving a command or information by being rotated. More specifically, the first user input module 130a may be used to enter various commands such as 'start', 'end', and 'scroll' to the mobile terminal 100, the second user input module 130b may be used to select an operating mode for the mobile terminal 100, and the third user input module 130c may serve as a hot key for activating certain functions of the mobile terminal 100.

When the display module 151 is approached by the user's finger, the proximity sensor 141 may detect the existence of the approaching finger, and may output a proximity signal. The proximity sensor 141 may output different proximity signals according to the distance between the display module 151 and the approaching finger. For a precise detection of the approaching finger, a plurality of proximity sensors 141 having different detection ranges may be employed. In this case, it is possible to precisely determine the distance between the approaching finger and the display module 151 by comparing a plurality of proximity signals respectively provided by the plurality of proximity sensors 141. In addition, it is possible to determine which part of the display module 151 is being approached by the approaching finger and whether the approaching finger is being moved within the close vicinity of the display module 15 by determining which of the plurality of proximity sensors 141 are outputting proximity signals. The controller 180 may identify a touch key, if any, currently being approached by the approaching finger and may then control the haptic module 157 to generate a vibration signal corresponding to the identified touch key.

When the user tilts or shakes the mobile terminal 100, the motion sensor 145 may detect the movement of the mobile terminal 100, and may generate a signal corresponding to the detected movement to the controller 180. The controller 180 may extract various motion information such as the direction, angle, speed and intensity of the movement of the mobile terminal 100 and the location of the mobile terminal 100 from the signal provided by the motion sensor 145.

The controller 180 may keep track of the movement of the mobile terminal 100 based on the extracted motion information. The type of motion information that can be extracted from the signal provided by the motion sensor 145 may vary according to the type of motion sensor 145. Thus, more than one motion sensor 145 capable of providing desired motion information may be employed in the mobile terminal 100. The controller 180 may control the motion sensor 145 to operate only when a predetermined application is executed.

Figure 3:
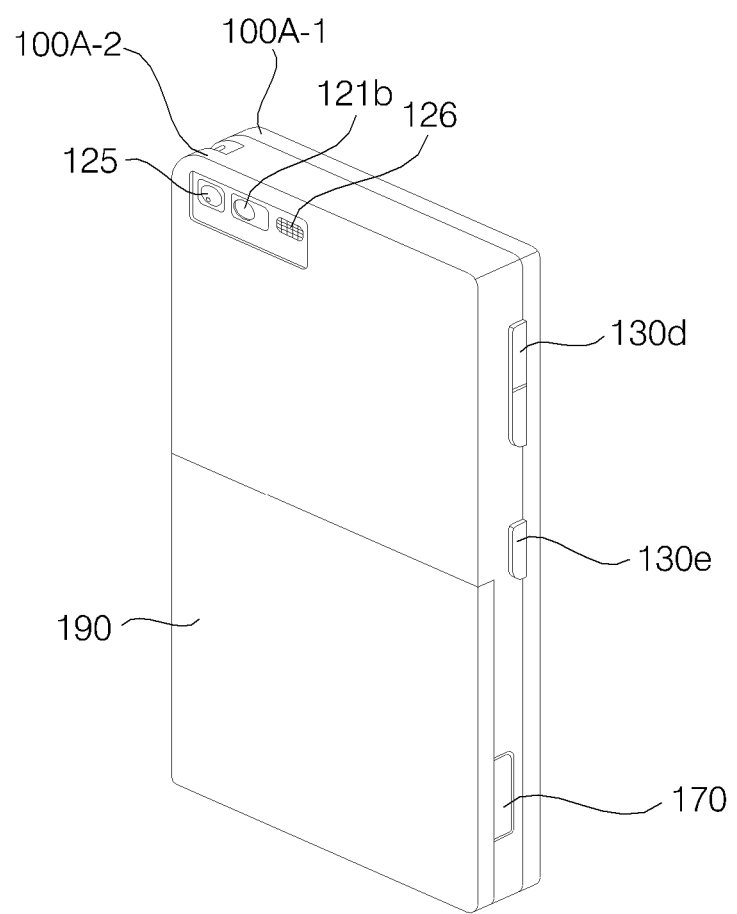
FIG. 3 illustrates a rear perspective view of the mobile terminal shown in FIG. 2.

FIG. 3 illustrates a rear perspective view of the mobile terminal 100. Referring to FIG. 3, the fourth and fifth user input modules 130d and 130e and the interface unit 170 may be disposed on one side of the rear case 100A-2, and a second camera 121b may be disposed at the back of the rear case 100A-2.

The second camera 121b may have a different shooting direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A mirror 125 and a camera flash 126 may be disposed near the second camera 121b. The mirror 125 may be used for the user to prepare him- or herself for taking a self-portrait. The cameral flash 126 may be used to illuminate a subject when the user attempts to capture an image of the subject with the second camera 121b.

A second audio output module (not shown) may be additionally provided in the rear case 100A-2. The second audio output module may realize a stereo function along with the first audio output module 153a. The second audio output module may also be used in a speaker-phone mode.

Not only an antenna (not shown) for making or receiving a call but also an antenna (not shown) for receiving a broadcast signal may be disposed on one side of the rear case 100A-2. The antennas may be installed so as to be able to be retracted from the rear case 100A-2.

The interface unit 170 may serve as a pathway for allowing the mobile terminal 100 to exchange data with an external device. For example, the interface unit 170 may include at least one of a connector for connecting earphones to the mobile terminal wiredly or wirelessly, a port for performing short-range communication, and a power supply port for supplying power to the mobile terminal 100. Alternatively, the interface unit 170 may include a card socket for receiving a SIM card, a UIM card or an exterior card such as a memory card.

The power supply unit 190, which supplies power to the mobile terminal 100, may be disposed in the rear case 100A-2. The power supply unit may be a rechargeable battery and may be coupled to the rear case 100A-2 so as to be attachable to or detachable from the rear case 100A-2.

The second camera 121b and the other elements that have been described as being provided in the rear case 100A-2 may be provided in the front case 100A-1. In addition, the first camera 121a may be configured to be rotatable and thus to cover the shooting direction of the second camera 121b. In this case, the second camera 121b may be optional.

Figure 4:
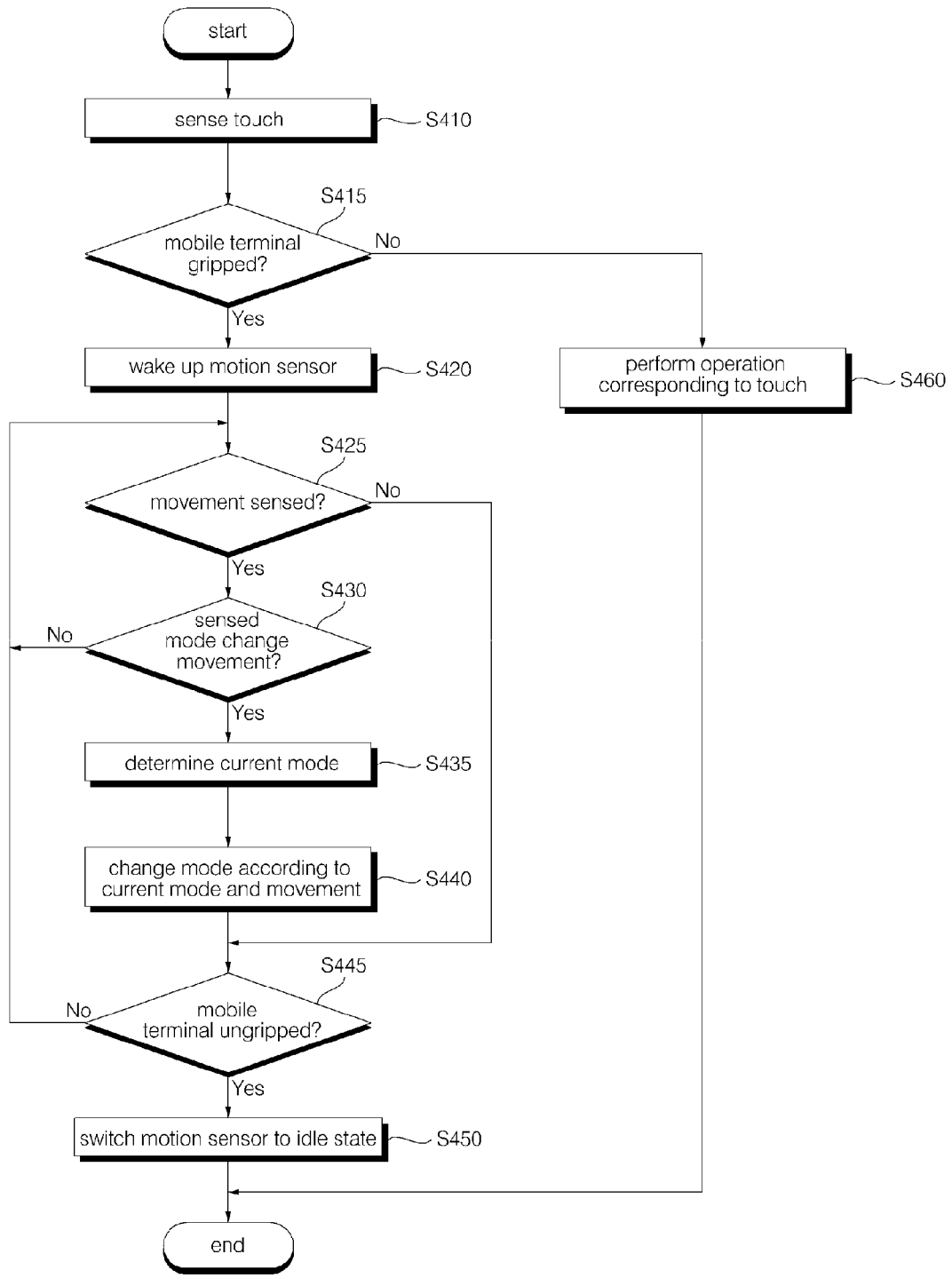
FIG. 4 is a flow chart illustrating a method for operating a mobile terminal according to a first embodiment of the present invention.

FIG. 4 is a flow chart illustrating a method for operating a mobile terminal according to a first embodiment of the present invention.

As shown in FIG. 4, when the mobile terminal is in a preset mode, a touch sensor senses touch of the mobile terminal and applies the sensed result to the controller 180 (S410). The user may touch a region in which touch is sensed by the touch sensor (hereinafter referred to as a "touch sense region") in order to change the mode of the mobile terminal or to change screens in the same mode. The touch sensor applies a sensed result corresponding to change in the sensed signal to the controller 180. The touch sense region of the mobile terminal may include the display module 151 and the user input unit 130.

In this embodiment, the touch sensor includes the pressure sensor 143 that senses direct contact by the user and the proximity sensor 141 that senses a user's proximity touch. Although not illustrated in FIG. 3, the touch sensor is preferably provided on at least one of the side surfaces of the mobile terminal. In addition, the sensor for sensing contact by the user is not limited to the touch sensor. A temperature sensor that detects temperature change due to proximity of the user or contact by the user may also be used to sense touch by the user.

The controller 180 determines whether or not the mobile terminal has been gripped based on the sensed touch (S415). The state in which the mobile terminal has been gripped includes the state in which the two opposing side surfaces of the mobile terminal are touched by the user's hand and the rear surface of the mobile terminal is covered by the user's hand (specifically, by the user's palm). More specifically, the state in which the mobile terminal has been gripped indicates the state in which the touch sense region formed on the side surfaces of the mobile terminal is touched by the user's hand and at least part of the rear surface of the mobile terminal is covered by the user's hand. When the touch sense region is distributed over the entire area of the mobile terminal, the controller 180 may determine whether or not the mobile terminal has been gripped by identifying the pattern of the touched region. Alternatively, the controller 180 may determine whether or not the mobile terminal has been gripped according to a setting state.

Upon determining that the mobile terminal has been gripped (Yes in step S415), the controller 180 wakes up the motion sensor 145 which is in an idle state (S420). Power consumption of the mobile terminal is high if the motion sensor 145 is always on while power is supplied to the mobile terminal. Therefore, the controller 180 may wake up the motion sensor 145 only when the mobile terminal has been gripped.

When the motion sensor 145 senses movement of the mobile terminal, the motion sensor 145 applies the sensed result to the controller 180 (S425). The user may change the position and direction of the mobile terminal while gripping the mobile terminal. In this case, the motion sensor 145 may sense the change of the position and direction of the mobile terminal and apply the sensed result to the controller 180.

The controller 180 determines whether or not the sensed movement is a mode change movement (S430). A movement database is provided in the memory 160 and the controller 180 determines whether or not the sensed movement is a mode change movement by determining whether or not the sensed movement is included in movements stored in the movement database. In the movement database, each movement is stored in association with a start mode which will be changed by the movement, and an end mode, to which the mode will be changed by the movement.

Upon determining that the sensed movement is a mode change movement ("Yes" in step S430), the controller 180 determines the current mode of the mobile terminal (S435).

Modes of the mobile terminal are classified into a power off mode, a sleep mode, and an active mode according to whether or not power is supplied. The power off mode is a mode in which power supply to the mobile terminal is off, the sleep mode is a mode in which power is not supplied to the display module 151 since an input signal such as a touch input or a key input has not been received for a preset time while power is supplied to the mobile terminal, and the active mode is a mode in which power is also supplied to the display module 151.

The modes of the mobile terminal are also classified into a standby mode, a menu mode, a communication event mode, and an execution mode according to the type of an application that is running on the mobile terminal. The standby mode is a mode in which a preset initial screen is displayed since no application is running although power is supplied to the display module 151, the menu mode is a mode in which a menu application is running to provide a menu, and the communication event mode is a mode in which a communication event has occurred. The execution mode is a mode in which an application corresponding to specific content is running to provide the specific content. The communication event mode is classified into various modes according to the type of the communication event and the execution mode is also classified into various modes according to the provided content. The standby mode, the menu mode, the communication event mode, and the execution mode will hereinafter be collectively referred to as an "operation mode".

The mobile terminal may be in the operation mode while being in the sleep mode and may also be in the operation mode while being in the active mode. When the mobile terminal is in the sleep mode while being in the operation mode, the mobile terminal is referred to as being in the sleep mode. When the mobile terminal is in one of the standby mode, the menu mode, and the execution mode while being in the active mode, the mobile terminal is referred to as being in one of the standby mode, the menu mode, and the execution mode.

The controller 180 changes the mode of the mobile terminal according to the current mode and the movement of the mobile terminal (S440). For example, when the mobile terminal is gripped and then rotated from a horizontal direction toward a vertical direction by a predetermined angle (for example, 30 degrees) while being in the sleep mode, the controller 180 changes the mode of the mobile terminal to the standby mode and displays a screen corresponding to the standby mode on the display module 151.

On the other hand, the controller 180 determines whether or not the mobile terminal has been ungripped (S445). That is, the controller 180 determines whether or not the mobile terminal has been ungripped based on a change in a sensed signal received from the touch sensor. For example, when the user stops touching at least one of the two side surfaces of the mobile terminal, the touch sensor applies the sensed result to the controller 180 and the controller 180 determines that the mobile terminal has been ungripped.

Upon determining that the mobile terminal has been ungripped (Yes in step S445), the controller 180 switches the motion sensor 145 to an idle state (S450).

On the other hand, upon determining that the mobile terminal has not been gripped in the above step S415, the controller 180 performs an operation corresponding to the touch (S460). For example, when the user has input a power off command through a touch, the controller 180 turns the mobile terminal off.

A method for changing the mode of the mobile terminal according to movement thereof after the mobile terminal is gripped will now be described in more detail with reference to the drawings.

Figure 5:
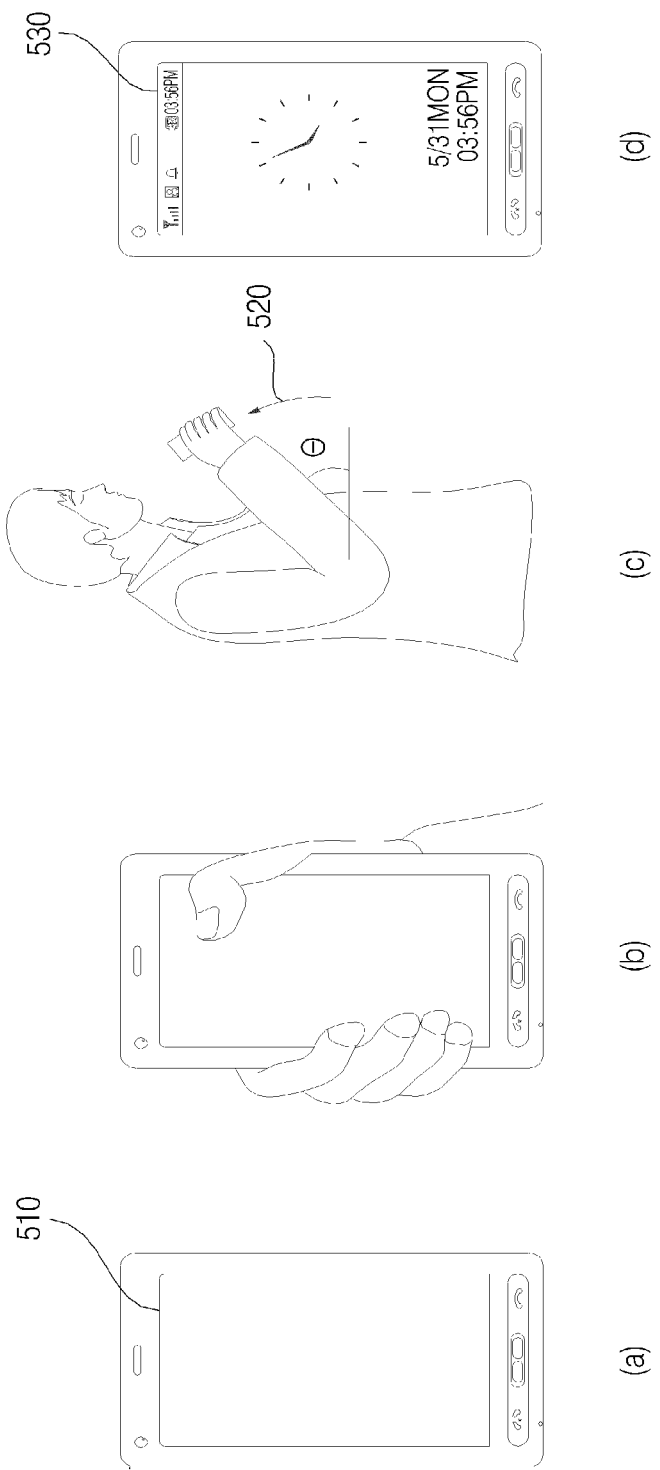
FIG. 5 illustrates a method for changing the mode of a mobile terminal from a sleep mode to a standby mode according to an embodiment of the present invention.

FIG. 5 illustrates a method for changing the mode of the mobile terminal from the sleep mode to the standby mode according to an embodiment of the present invention.

Power to the display module 151 is cut off when a user command has not been received for a predetermined time or when the mobile terminal is set to the sleep mode according to a user command. As shown in FIG. 5(a), in this case, a blank screen 510 is displayed on the display module 151. The user grips the mobile terminal as shown in FIG. 5(b) while the mobile terminal is in the sleep mode. That is, the user may touch both side surfaces of the mobile terminal while covering at least part of the rear surface of the mobile terminal. Then, the controller 180 may receive touch signals sensed by touch sensors provided on the two side surfaces and may determine that the mobile terminal has been gripped based on the sensed signals. Upon determining that the mobile terminal has been gripped, the controller 180 wakes up the motion sensor 145 which is in the idle state. The motion sensor senses movement of the mobile terminal and applies the sensed movement to the controller 180.

When the user makes a first movement 520 of rotating the mobile terminal by a predetermined angle or more as shown in FIG. 5(c), the controller 180 detects the first movement 520. The controller 180 turns power of the display module 151 on and releases the touch lock and then changes the mode of the mobile terminal from the sleep mode to the standby mode to display a screen 530 corresponding to the standby mode on the display module 151 as shown in FIG. 5(d).

Figure 6:
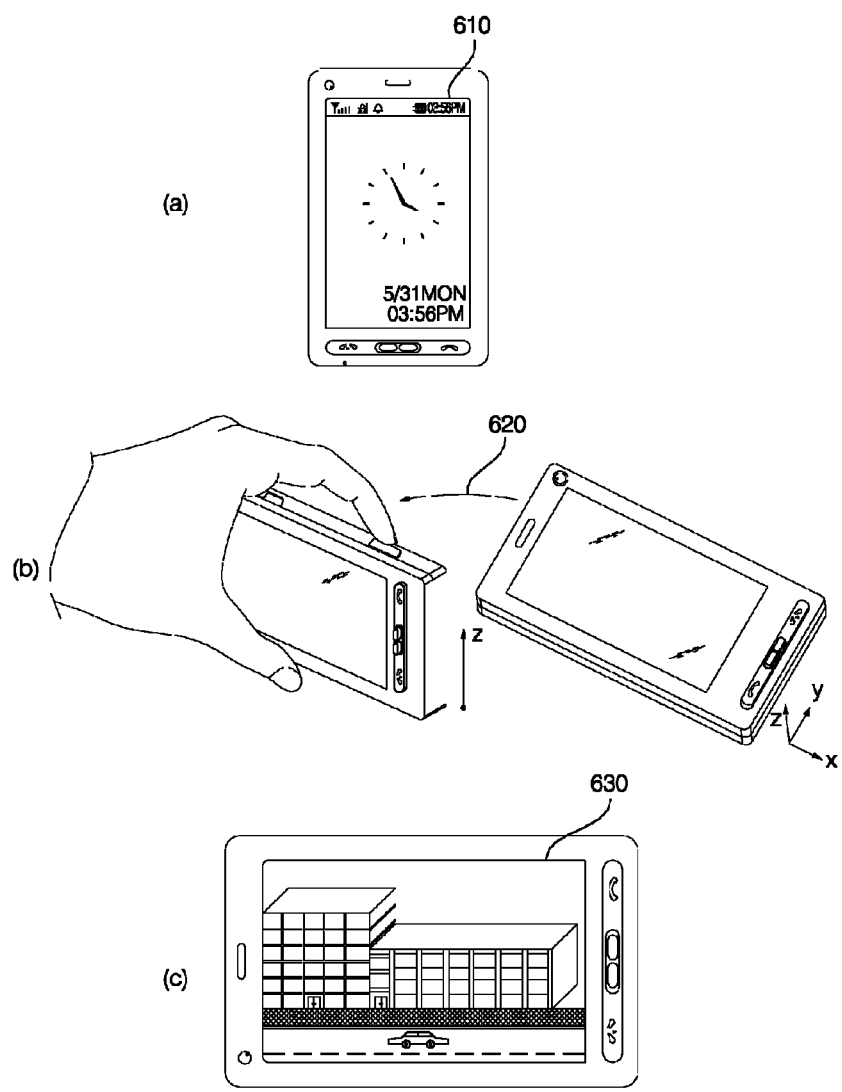
FIG. 6 illustrates a method for changing the mode of a mobile terminal from a standby mode to a camera mode according to an embodiment of the present invention.

FIG. 6 illustrates a method for changing the mode of the mobile terminal from the standby mode to a camera mode according to an embodiment of the present invention.

When the standby mode is set, a screen 610 corresponding to the standby mode is displayed on the display module 151 as shown in FIG. 6(a). The user grips the mobile terminal as shown in FIG. 6(b). This allows the controller 180 to wake up the motion sensor 145 and to cause the motion sensor 145 to sense movement of the mobile terminal. On the other hand, the user changes at least one of the position and direction of the mobile terminal to make a second movement 620 of vertically standing the display module 151 of the mobile terminal as shown in FIG. 6(c). Then, the controller 180 changes the mode of the mobile terminal from the standby mode to the camera mode according to the standby mode and the second movement 620. The controller 180 then displays a screen 630 (i.e., a preview screen) corresponding to the camera mode on the display module 151 as shown in FIG. 6(d).

Figure 7:
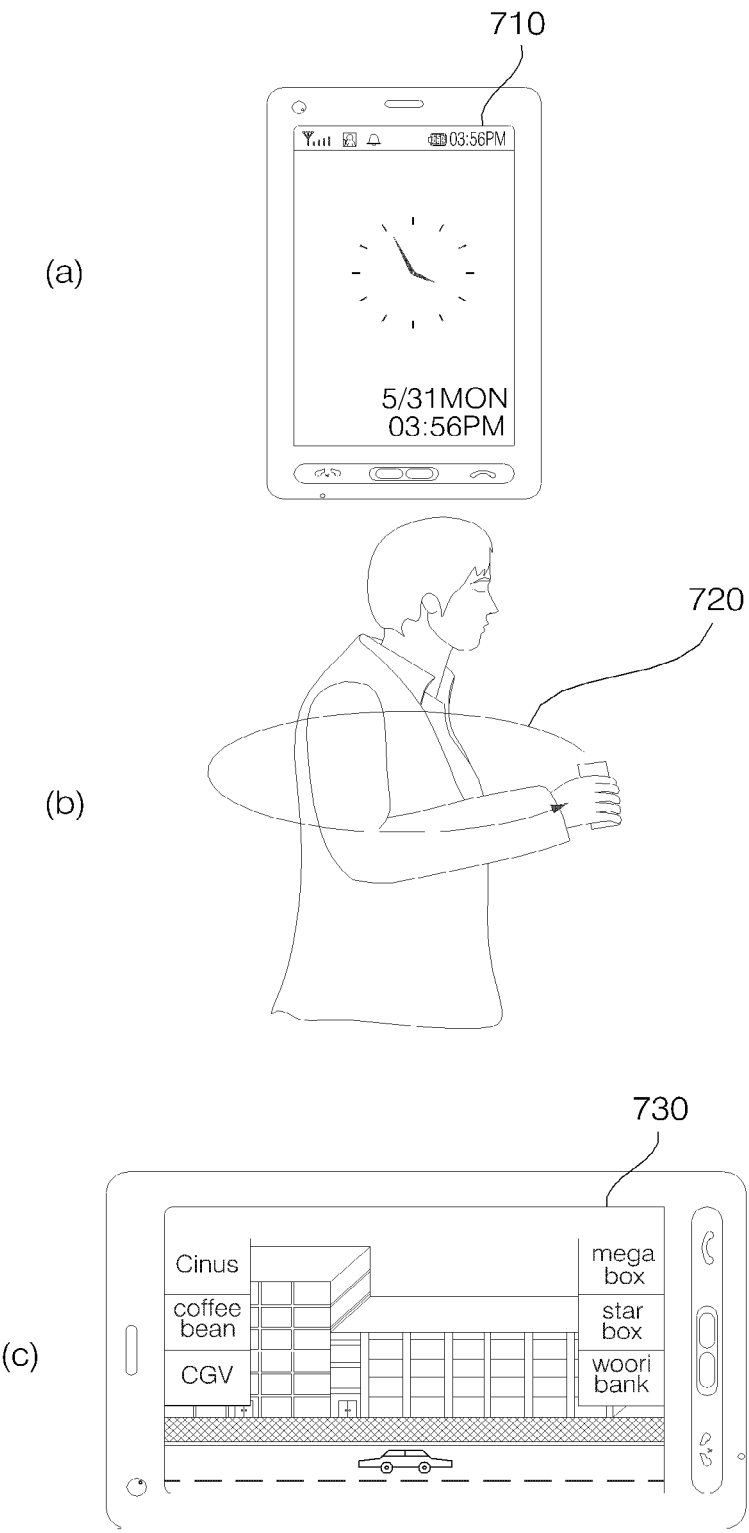
FIG. 7 illustrates a method for changing the mode of a mobile terminal from a standby mode to an augmented reality mode according to an embodiment of the present invention.

FIG. 7 illustrates a method for changing the mode of the mobile terminal from the standby mode to an augmented reality mode according to an embodiment of the present invention.

When the standby mode is set, a screen 710 corresponding to the standby mode is displayed on the display module 151. The user grips the mobile terminal on which the screen 710 corresponding to the standby mode is displayed as shown in FIG. 7(a). The user then changes at least one of the position and direction of the mobile terminal to make a third movement 720 of rotating the mobile terminal one turn about an axis (for example, a vertical axis of the mobile terminal) as shown in FIG. 7(b). Then, the controller 180 changes the mode of the mobile terminal from the standby mode to the augmented reality mode according to the standby mode and the third movement 720. The controller 180 displays a screen 730 corresponding to the augmented reality mode on the display module 151 as shown in FIG. 7(c). That is, the controller 180 activates the GPS module to acquire the current position of the mobile terminal. The controller 180 then acquires information of objects present around the current position within a predetermined distance and displays the object information together with a preview image on the display module 151.

Figure 8:
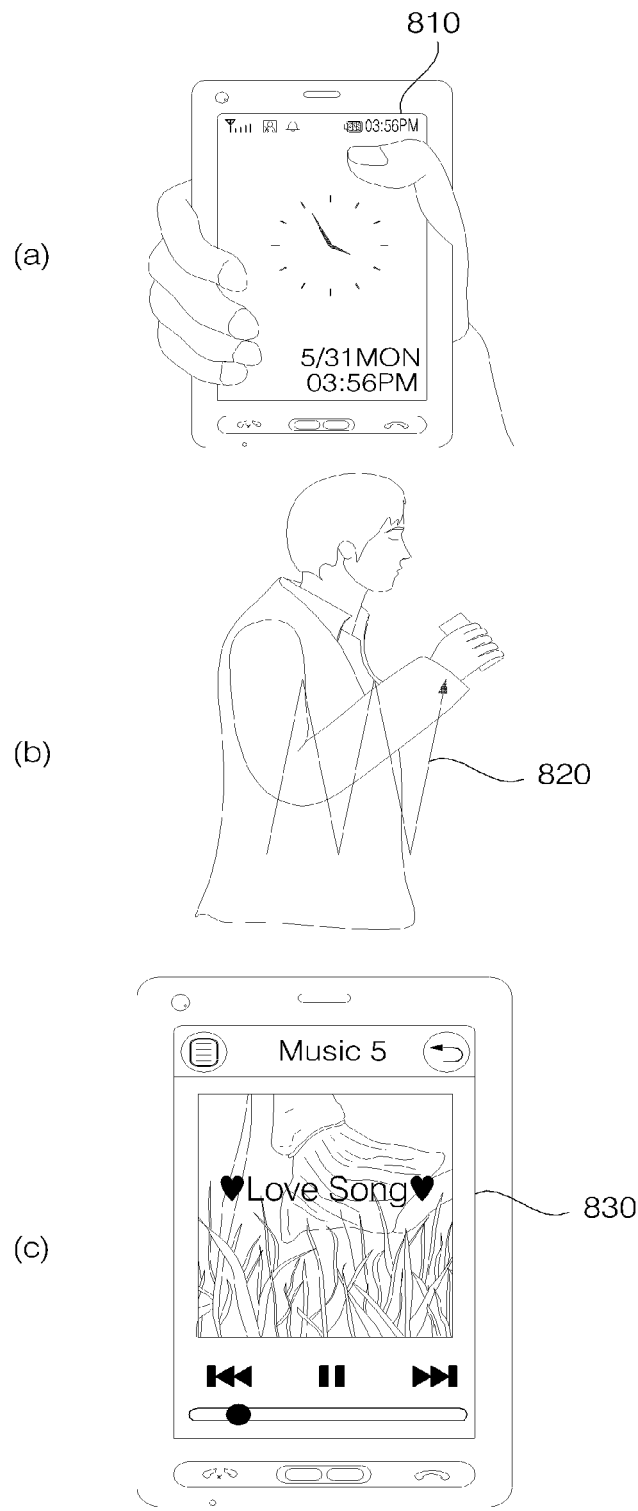
FIG. 8 illustrates a method for changing the mode of a mobile terminal from a standby mode to a music playback mode according to an embodiment of the present invention.

FIG. 8 illustrates a method for changing the mode of the mobile terminal from the standby mode to a music playback mode according to an embodiment of the present invention.

When the standby mode is set, a screen 810 corresponding to the standby mode is displayed on the display module 151. The user grips the mobile terminal on which the screen 810 corresponding to the standby mode is displayed as shown in FIG. 8(a). The user then changes at least one of the position and direction of the mobile terminal to make a fourth movement 820 of tracing an "M" shaped path using the mobile terminal while gripping the mobile terminal. Then, the controller 180 changes the mode of the mobile terminal from the standby mode to the music playback mode and plays music while displaying a screen 830 corresponding to the music playback mode on the display module 151 as shown in FIG. 8(c).

Figure 9:
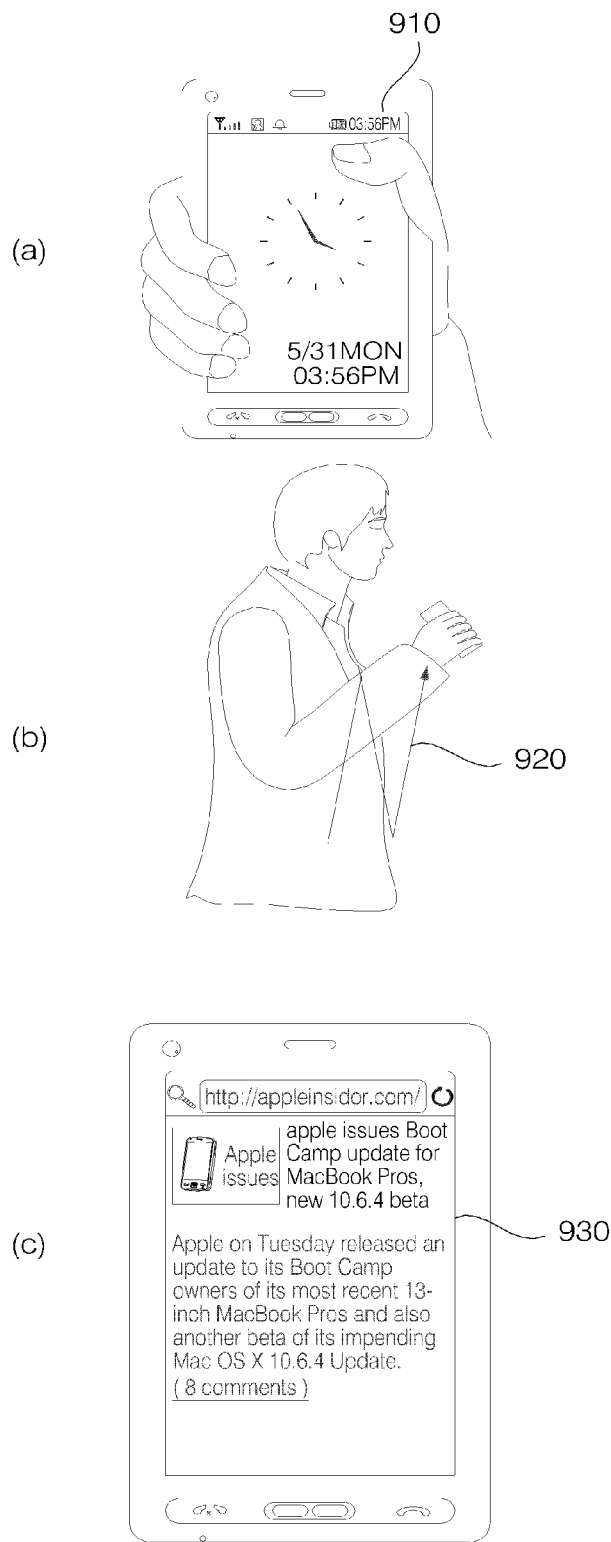
FIG. 9 illustrates a method for changing the mode of a mobile terminal from a standby mode to a web browser mode according to an embodiment of the present invention.

FIG. 9 illustrates a method for changing the mode of the mobile terminal from the standby mode to a web browser mode according to an embodiment of the present invention.

When the standby mode is set, a screen 910 corresponding to the standby mode is displayed on the display module 151 as shown in FIG. 9(a). With the mobile terminal being set to the standby mode, the user makes a fifth movement 920 of tracing an "N" shaped path using the mobile terminal while gripping the mobile terminal as shown in FIG. 9(b). Then, the controller 180 changes the mode of the mobile terminal from the standby mode to the web browser mode and displays a screen 930 corresponding to the web browser mode on the display module 151 as shown in FIG. 9(c).

This embodiment has been described such that the controller 180 changes the mode of the mobile terminal from the standby mode to another mode corresponding to movement of the mobile terminal. However, when movement of the mobile terminal is detected in the sleep mode while the mobile terminal is gripped, the controller 180 may also change the mode of the mobile terminal from the sleep mode to a mode corresponding to the movement.

Figure 10:
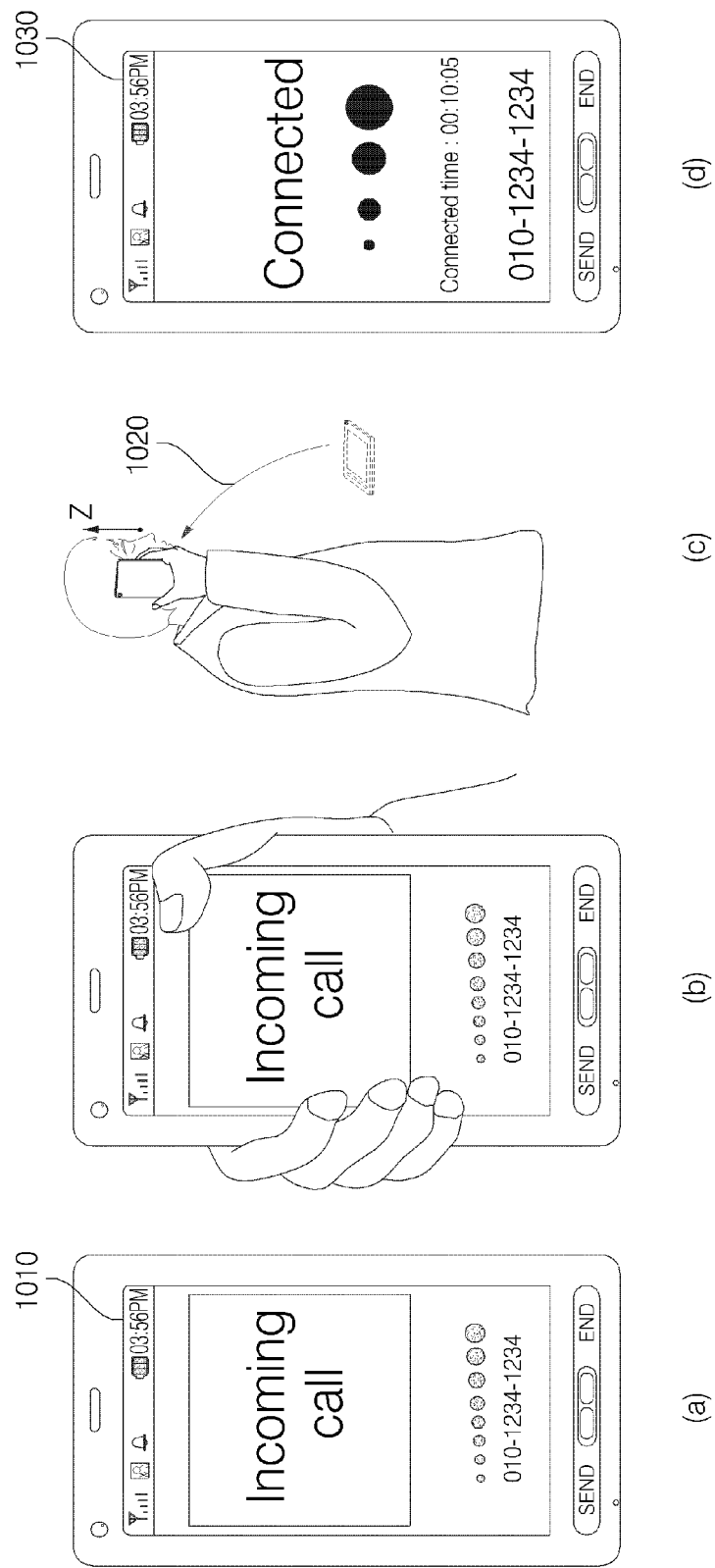
FIG. 10 illustrates a method for changing the mode of a mobile terminal from a call connecting mode to a connected mode according to an embodiment of the present invention.

FIG. 10 illustrates a method for changing the mode of the mobile terminal from a call connecting mode to a connected mode according to an embodiment of the present invention.

When the mobile terminal receives a call signal from an external device, the controller 180 changes the mode of the mobile terminal to the call connecting mode and displays a screen 1010 corresponding to the call connecting mode as shown in FIG. 10(a). The user may then grip the mobile terminal as shown in FIG. 10(b). This causes the controller 180 to wake up the motion sensor 145 of the controller 180. Then, the user changes at least one of the position and direction of the mobile terminal to make a sixth movement 1020 to vertically stand the display module 151 of the mobile terminal as shown in FIG. 10(c). Then, the motion sensor 145 senses and applies the sixth movement to the controller 180. The controller 180 then changes the mode of the mobile terminal from the call connecting mode to the connected mode according to the call connecting mode and the sixth movement and displays a screen 1030 corresponding to the connected mode on the display module 151 as shown in FIG. 10(d). While the mobile terminal is in the connected mode, the controller 180 outputs an audio signal received from the external device through a speaker and transmits an audio signal received through a microphone to the external device.

This embodiment has been described with reference to an example in which the controller 180 wakes up the motion sensor 145 upon determining that the mobile terminal has been gripped, i.e., a user command corresponding to gripping of the mobile terminal is used as a command to wake up the motion sensor 145, the present invention is not limited to this example and the user command corresponding to gripping of the mobile terminal may include a command to change the function of the mobile terminal. For example, when the user grips the mobile terminal while the mobile terminal outputs a ringtone in a call connecting mode, the controller 180 may change the ring alert function of the mobile terminal from ringtone to vibration.

Figure 11:
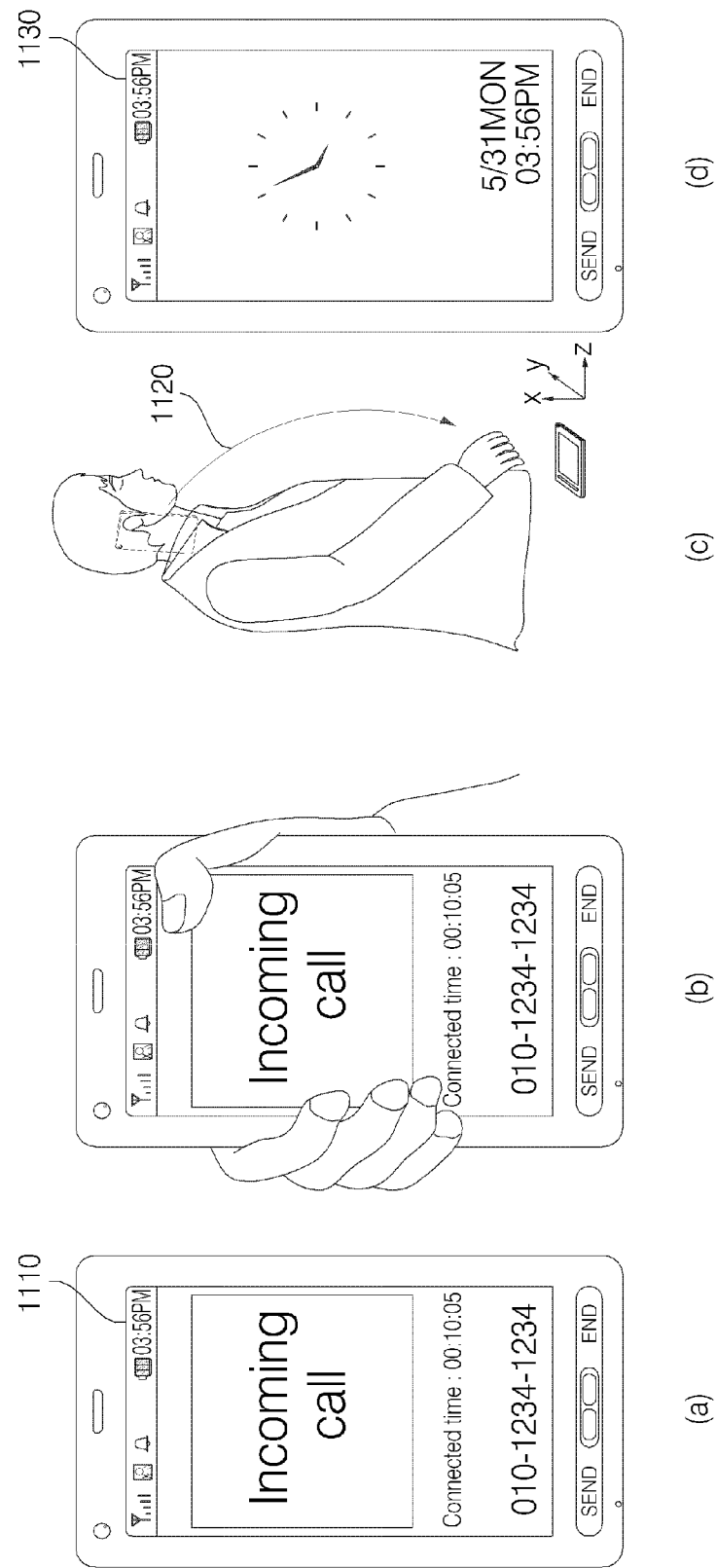
FIG. 11 illustrates a method for changing the mode of a mobile terminal from a function execution mode to a standby mode according to an embodiment of the present invention.

FIG. 11 illustrates a method for changing the mode of the mobile terminal from a function execution mode to the standby mode according to an embodiment of the present invention.

When a specific function such as moving image playback, other multimedia file playback, DMB watching, or other broadcast watching is running according to a user command, the controller 180 displays a screen 1110 corresponding to a function execution mode corresponding to the specific function as shown in FIG. 11(a). The function execution mode may be a moving image display mode, a communication event execution mode (for example, a connected mode, a message check mode, or the like), a web execution mode, a broadcast provision mode, or the like. Examples of the displayed screen include a moving image playback screen, a communication event screen, a webpage screen, a broadcast screen, and the like.

The user may then grip the mobile terminal as shown in FIG. 11(b). Then, the user changes at least one of the position and direction of the mobile terminal to make a seventh movement 1120 to lay the mobile terminal horizontally as shown in FIG. 11(c). Then, the controller 180 terminates execution of the function according to the execution mode and the seventh movement and changes the mode of the mobile terminal to the standby mode and displays a screen 1130 corresponding to the standby mode as shown in FIG. 11(d).

The movement of the mobile terminal for changing the mode described above in this embodiment is only an example. That is, the mode of the mobile terminal may be changed through a different type of movement. The user may also set and register a movement pattern for changing the mode of the mobile terminal.

Figure 12:
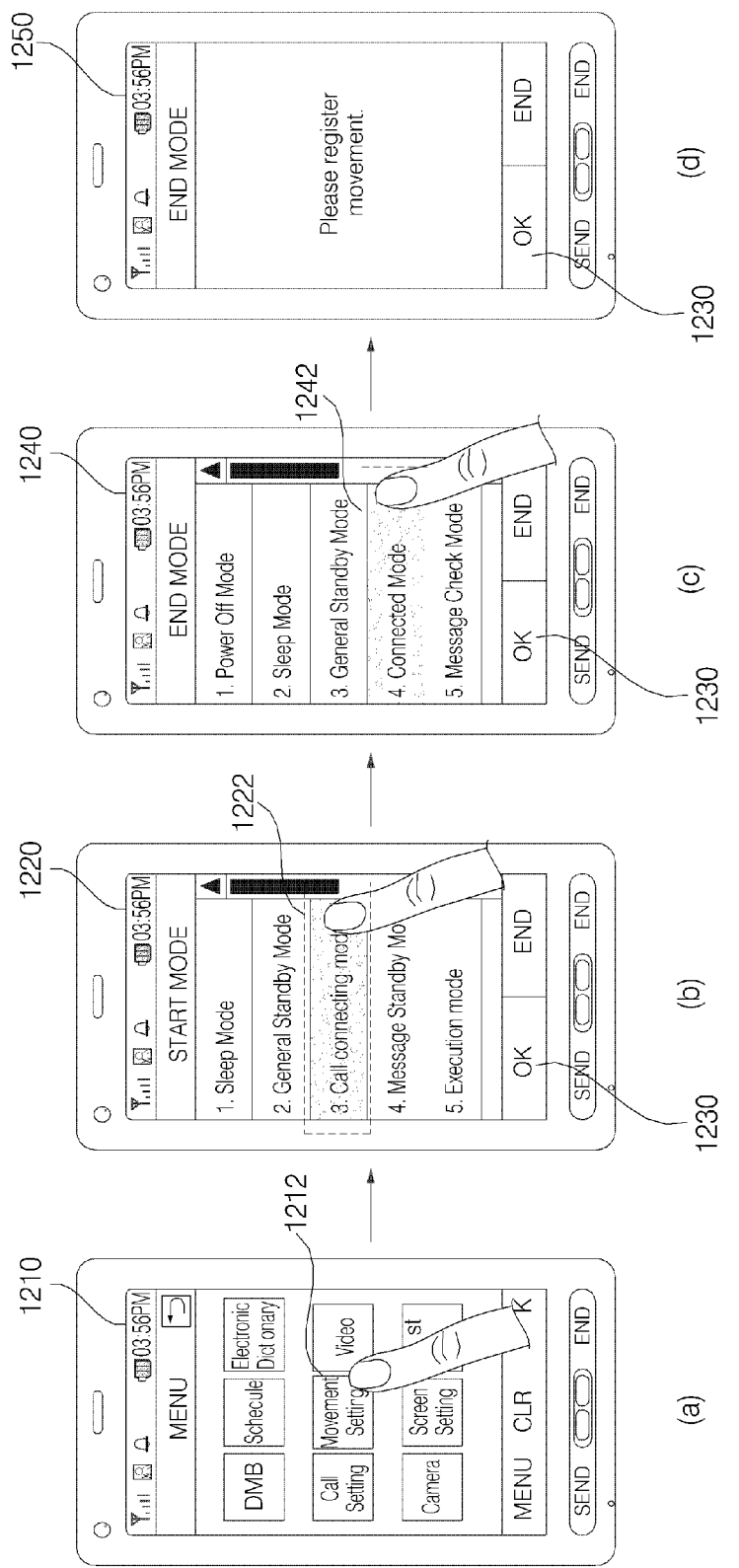
FIG. 12 illustrates a procedure for setting a movement pattern for changing the mode of a mobile terminal according to an embodiment of the present invention.

FIG. 12 illustrates a procedure for setting a movement pattern for changing the mode of the mobile terminal according to an embodiment of the present invention.

When a screen 1210 corresponding to the menu mode is displayed on the display module 151 as shown in FIG. 12(a), the user selects a movement setting item 1212 for setting a movement from the menu. Then, a list 1220 of start modes, each of which will be changed to another mode when a movement is sensed, is displayed on the display module 151 as shown in FIG. 12(b). The user may then select at least one item 1222 from the start mode list 1220. Then, when a check icon 1230 is selected, a list 1240 of end modes, each of which will be set when a movement is sensed, is displayed on the display module 151 as shown in FIG. 12(c). The user may set one item 1242 from the end mode list 1240. When a check icon 1230 is selected, the controller 180 generates and displays a notification message 1250 prompting the user to register a movement FIG. 12(d). The user may make a movement to be registered using the mobile terminal and then may select an OK icon 1230 to register the movement.

Although this embodiment has been described such that the pressure sensor, the proximity sensor, the temperature sensor, and the like are used to sense gripping of the mobile terminal, various other sensors may also be used to sense gripping of the mobile terminal, without being limited to such sensors.

Figure 13:
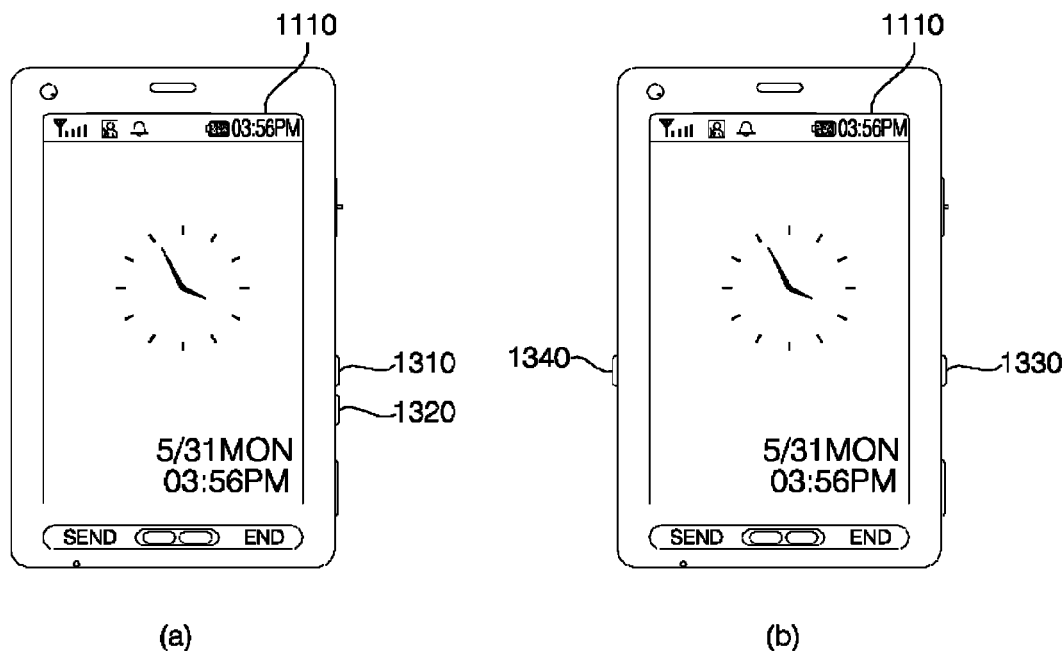
FIG. 13 illustrates a mobile terminal including a sensor for sensing gripping of the mobile terminal according to an embodiment of the present invention.

FIG. 13 illustrates a mobile terminal including a sensor for sensing gripping of the mobile terminal according to an embodiment of the present invention.

The sensor for sensing gripping may be a capacitive sensor. The capacitive sensor is provided inside the mobile terminal. A first key 1310 connected to a transmitting terminal of the capacitive sensor and a second key 1320 connected to a receiving terminal of the capacitive sensor may be provided on a side surface of the mobile terminal as shown in FIG. 13(*a*). The first key 1310 and the second key 1320 are preferably plated with a conductive substance. Thus, when the user grips the mobile terminal by their hand, the hand contacts the first key 1310 and the second key 1320, creating a closed loop of electric field in the capacitive sensor. When the closed loop of electric field is created in the capacitive sensor, the controller 180 determines that the mobile terminal has been gripped.

The first key 1310 and the second key 1320 do not need to be arranged side by side on a side surface of the mobile terminal. The first key 1310 and the second key 1320 only need to be arranged in a region where the user's hand contacts the mobile terminal when the user grips the mobile terminal.

For example, a third key 1330 connected to the transmitting terminal of the capacitive sensor may be provided on a first side surface of the mobile terminal and a fourth key 1340 connected to the receiving terminal of the capacitive sensor may be provided on a second side surface of the mobile terminal, which is opposite to the first side surface, as shown in FIG. 13(*b*). Such additional keys connected to the capacitive sensor need not be provided and, instead, existing keys may be plated with a conductive substance and one of the keys may be connected to the transmitting terminal of the capacitive sensor and another key may be connected to the receiving terminal of the capacitive sensor and the controller 180 may determine that the mobile terminal has been gripped when the user's hand contacts the transmitting and receiving terminals.

This embodiment has been described with reference to a method in which the mode of the mobile terminal is changed according to both gripping of the mobile terminal and movement of the mobile terminal. However, the present invention is not limited to this method. For example, the mode of the mobile terminal may be changed through gripping of the mobile terminal alone, regardless of the movement of the mobile terminal.

Figure 14:
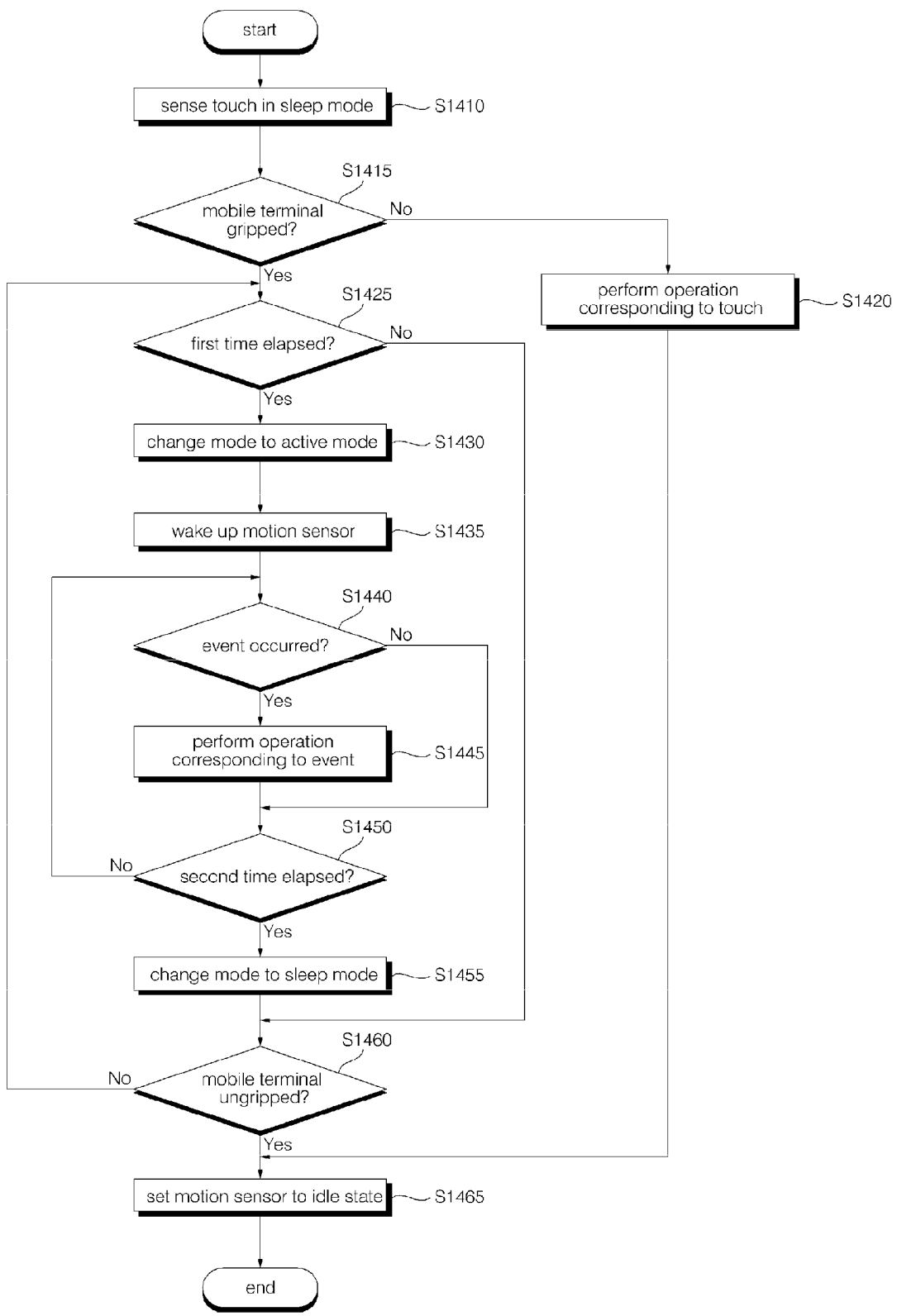
FIG. 14 is a flow chart illustrating a method for operating a mobile terminal according to a second embodiment of the present invention.

FIG. 14 is a flow chart illustrating a method for operating a mobile terminal according to a second embodiment of the present invention.

As shown in FIG. 14, when the mobile terminal is in the sleep mode, the touch sensor senses touch of the mobile terminal and applies the sensed result to the controller 180 (S1410). The controller 180 determines whether or not the mobile terminal has been gripped based on the sensed touch (S1415). Upon determining that the mobile terminal has not been gripped although the touch has been sensed ("No" in step S1415), the controller 180 performs an operation corresponding to the touch (S1420).

On the other hand, upon determining that the mobile terminal has been gripped ("Yes" in step S1415), the controller 180 determines whether or not a first time has elapsed while the mobile terminal is gripped (S1425). The user may change the first time to a value preset in the mobile terminal. When the first time has elapsed while the mobile terminal is gripped ("Yes" in step S1425), the controller 180 changes the mode of the mobile terminal to an active mode (S1430). That is, power is supplied to the display module 151. By changing the mode of the mobile terminal to the active mode when the first time has elapsed while the mobile terminal is gripped, it is possible to prevent the mobile terminal from being activated by momentary touch.

Then, the controller 180 wakes up the motion sensor 145 which is in an idle state (S1435). Power consumption of the mobile terminal is high if the motion sensor 145 is always on while power is supplied to the mobile terminal. Therefore, the controller 180 may wake up the motion sensor 145 only when the mobile terminal has been gripped.

Upon determining that an event has occurred in the mobile terminal ("Yes" in step S1440), the controller 180 performs an operation corresponding to the event (S1445). The event may be classified into a communication event and a user command event. When a communication event such as call reception, message reception, alarm generation, or the like has occurred, the controller 180 displays a standby screen corresponding to the communication event on the display module 151. On the other hand, when a user command event such as input of a user command through touch or movement has occurred, the controller 180 displays an operation screen corresponding to the user command on the display module 151. That is, the event includes movement of the mobile terminal in the example of FIG. 4. A detailed explanation of this case is omitted to avoid redundant description.

The controller 180 determines whether or not a second preset time has elapsed while the mobile terminal is gripped (S1450). Here, it is preferable that the second time be measured after the motion sensor is woken up or after the event has occurred. Similar to the first time, the second time may also be changed by the user.

When the second time has elapsed ("Yes" in step S1450), the controller 180 changes the mode of the mobile terminal back to the sleep mode (S1455). That is, when no event has occurred while the mobile terminal is gripped, the controller 180 also changes the mode of the mobile terminal to the sleep mode. Thus, the controller 180 cuts off power to the display module 151. It is possible to prevent power consumption of the mobile terminal when the user unconsciously grips the mobile terminal by changing the mode of the mobile terminal to the sleep mode when a preset time has elapsed while the mobile terminal is gripped as described above.

Upon determining that the mobile terminal is ungripped ("Yes" in step S1460), the controller 180 sets the state of the motion sensor to an idle state (S1465). When the mobile terminal is ungripped before the first time has elapsed, the state of the motion sensor is set to the idle state and therefore the controller 180 does not need to perform an additional operation for setting the state of the motion sensor to the idle state.

Since the mode of the mobile terminal is also changed through gripping of the mobile terminal when the mobile terminal is in the sleep mode as described above, the user may grip the mobile terminal to check the operation mode of the mobile terminal.

The present invention can be realized as code that can be read by a processor included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for operating a mobile terminal, the method comprising:
sensing, by a touch sensor of the mobile terminal, touch of the mobile terminal in a sleep mode;
changing a mode of the mobile terminal from the sleep mode to an active mode when a first threshold time elapses after the mobile terminal has been gripped by a user touching the mobile terminal that is in the sleep mode, a motion sensor of the mobile terminal being activated;
sensing, by the activated motion sensor, movement of the gripped mobile terminal;
determining that a current mode is a first mode and changing the mode of the mobile terminal from the first mode to a second mode according to the first mode and the sensed movement when the sensed movement corresponds to a specific type of movement stored in a memory of the mobile terminal; and
deactivating the motion sensor when the mobile terminal has been ungripped,
wherein the specific type of movement of the mobile terminal, resulting in the change of the mode from the first mode to the second mode, is pre-set by:
receiving a first input for selecting the first mode;
receiving a second input for selecting the second mode;
detecting the specific type of movement of the mobile terminal to be associated with the selected first mode and second mode, the specific type of movement generated by actual movement of the mobile terminal and sensed by the motion sensor; and
storing, in the memory, the specific type of movement of the mobile terminal associated with the mode change from the first mode to the second mode such that the mode change is performed in response to a movement corresponding to the specific type of movement.

2. The method according to claim 1, wherein gripping the mobile terminal comprises touching at least one side surface of the mobile terminal.

3. The method according to claim 1, further comprising changing the mode of the mobile terminal back to the sleep mode when a second threshold time elapses without occurrence of any event while the mobile terminal is gripped.

4. The method according to claim 1, wherein:
the first mode is a standby mode and the second mode is a camera mode; and
the sensed movement of the mobile terminal includes rotation of the mobile terminal from a first direction to a second direction.

5. The method according to claim 1, wherein:
the first mode is a call connecting mode and the second mode is a connected call mode; and
the sensed movement of the mobile terminal includes rotation of the mobile terminal from a first direction to a second direction.

6. The method according to claim 1, wherein:
the first mode is a message creation mode and the second mode is a standby mode, the sensed movement of the mobile terminal includes rotation of the mobile terminal from a first direction to a second direction; and
a message created in the message creation mode is transmitted to an external device before the mode of the mobile terminal is changed from the message creation mode to the standby mode.

7. The method according to claim 1, wherein:
the first mode is a standby mode and the second mode is an augmented reality mode; and
the sensed movement of the mobile terminal includes rotation of the mobile terminal by 360 degrees.

8. The method according to claim 1, wherein:
the first mode is an application execution mode and the second mode is a standby mode;
the sensed movement of the mobile terminal includes a rotation of the mobile terminal from a first direction to a second direction; and
an application executed during the application execution mode is terminated before the mode of the mobile terminal is changed from the application execution mode to the standby mode.

9. The method according to claim 1, further comprising changing a current function performed by the mobile terminal to a different function upon determining that the mobile terminal has been gripped.

10. A mobile terminal comprising:
a main body;
a touch sensor configured to sense touch of the main body in a sleep mode;
a motion sensor configured to sense movement of the main body;
a memory configured to store information; and
a controller configured to:
change a mode of the mobile terminal from the sleep mode to an active mode when a first threshold time elapses after the mobile terminal has been gripped by a user touching the mobile terminal that is in the sleep mode, the motion sensor being activated to sense the movement of the main body;
determine that a current mode is a first mode and change the mode of the mobile terminal from the first mode to a second mode according to the first mode and the sensed movements when the sensed movement corresponds to a specific type of movement stored in the memory; and
deactivate the motion sensor when the mobile terminal has been ungripped,
wherein the controller is further configured to pre-set the specific type of movement of the mobile terminal, resulting in change from the first mode to the second mode, by:
recognizing a first input for selecting the first mode;
recognizing a second input for selecting the second mode;
detecting the specific type of movement of the mobile terminal to be associated with the selected first mode and second mode, the specific type of movement generated by actual movement of the mobile terminal and sensed by the motion sensor; and
storing, in the memory, the specific type of movement of the mobile terminal associated with the mode change from the first mode to the second mode such that the mode change is performed in response to a movement corresponding to the specific type of movement.

11. The mobile terminal according to claim 10, wherein the controller is further configured to determine that the main body has been gripped upon receiving a sensing result from the touch sensor, the sensing result indicating that the touch has been received at at least one side surface of the main body.

12. The mobile terminal according to claim 10, wherein the controller is further configured to change the mode of the mobile terminal back to the sleep mode when a second threshold time elapses without occurrence of any event while the mobile terminal is gripped.

13. The mobile terminal according to claim 10, wherein:
   the first mode is a standby mode and the second mode is a camera mode; and
   the movement sensed by the motion sensor includes rotation of the mobile terminal from a first direction to a second direction.

14. The mobile terminal according to claim 10, wherein:
   the first mode is a standby mode and the second mode is an augmented reality mode; and
   the movement sensed by the motion sensor includes rotation of the mobile terminal by 360 degrees.

15. The mobile terminal according to claim 10, wherein the touch sensor comprises a capacitive sensor.

16. The mobile terminal according to claim 15, wherein the main body includes a first key connected to a transmitting terminal of the capacitive sensor and a second key connected to a receiving terminal of the capacitive sensor.

17. The mobile terminal according to claim 10, further comprising a speaker, a microphone, and a display, wherein:
   the first mode is a call connecting mode entered upon receiving a call signal from an external device and the display displays a screen corresponding to the call connecting mode;
   the second mode is a connected call mode in which an audio signal received from the external device is output through the speaker and an audio signal received via the microphone is transmitted to the external device; and
   no user input, except for the movement of the main body, is received to change the mode from the first mode to the second mode.

* * * * *